Nov. 5, 1935.  G. KEINATH  2,020,067
DEVICE FOR DETERMINING THE TEMPERATURE OF ELECTRICALLY CONDUCTIVE BODIES
Filed Aug. 16, 1933  2 Sheets-Sheet 1
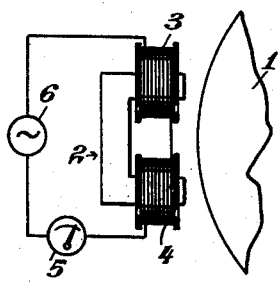
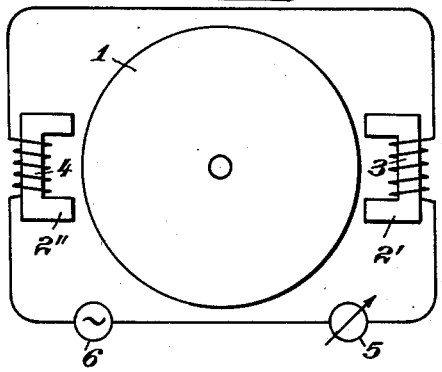
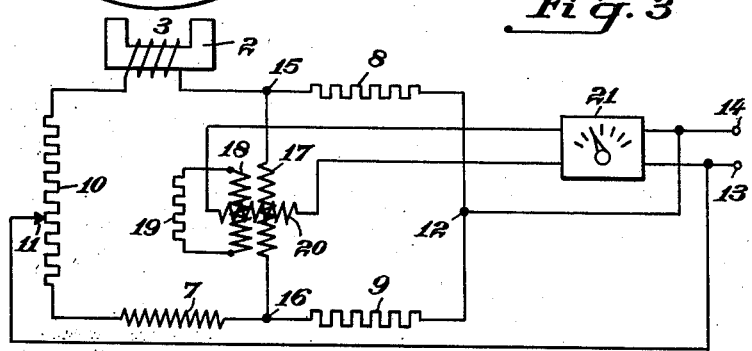
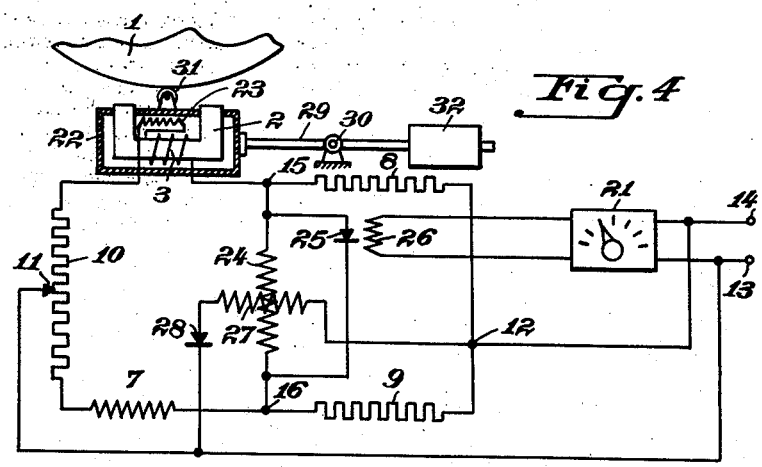
INVENTOR
GEORG KEINATH
BY
ATTORNEYS

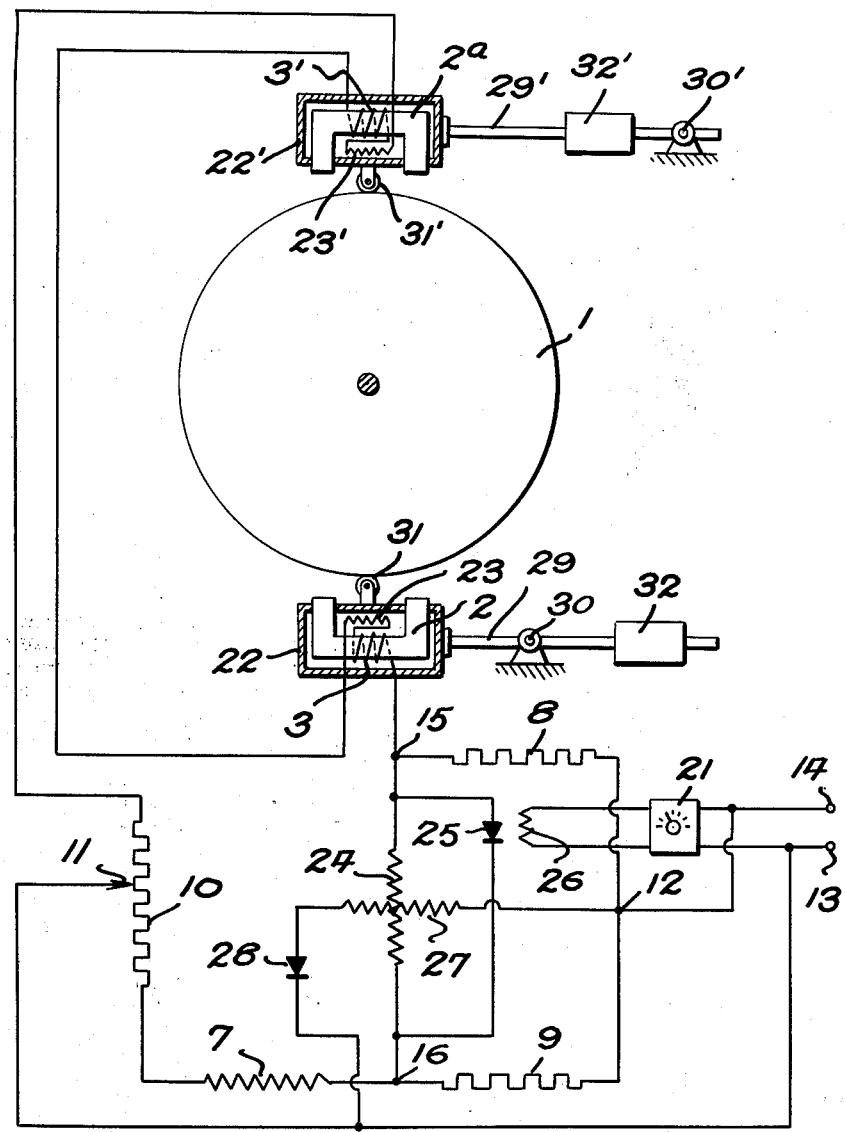

Patented Nov. 5, 1935

2,020,067

UNITED STATES PATENT OFFICE 2,020,067

DEVICE FOR DETERMINING THE TEMPERATURE OF ELECTRICALLY CONDUCTIVE BODIES

Georg Keinath, Berlin-Charlottenburg, Germany, assignor to Siemens & Halske, Aktiengesellschaft, Siemensstadt, near Berlin, Germany, a corporation of Germany Application August 16, 1933, Serial No. 685,408
In Germany January 14, 1931

12 Claims. (Cl. 73—32)

My invention relates to devices for determining the temperature of electrically conductive bodies, more particularly of calender rollers or similar metallic bodies, whose surfaces are maintained by some heating means at a definite temperature. For determining the temperature of electrically conductive bodies, use may be made of thermocouples or electric resistance thermometers, which are in contact with the bodies under test. This requires however an electric insulation of the thermocouples or the resistance coils of the electrically conductive body. This method has the disadvantage that the passage of heat through the insulating layer is rendered more difficult and that the test reading may thereby be erroneous. If the body the temperature of which is under test, swings or rotates, as is often the case, such an arrangement is, in addition, very objectionable since provision must be made for movable leads or loop contacts connected to the current-carrying line. For measuring the temperature of calender rollers, therefore use has, in general been made heretofore of thermocouples placed in a vessel, well insulated from heat and open at one end, with the open end of the vessel facing the roller surface. This well-known method of measuring involves not only a relatively complicated design, but has moreover the disadvantage that only the heat radiating from the roller surface is effective, which may give rise to considerable errors.

According to the invention, for measuring the temperature of electrically conductive bodies use is made of an electrical measuring set, connected in the exciting circuit of an electrically produced alternating field which passes through the surface layer of the conductive body whose temperature is to be measured. The alternating field gives rise to eddy currents in the electrically conductive material. Because of the changes in the electric conductivity of the material produced by variations in temperature, the intensity of the eddy current field also varies with the temperature, so that the energy absorption, measured by the instrument connected in the exciting circuit of the alternating field, serves as a measure of the temperature in the surface layer of the conductive body which is traversed by the alternating field.

The alternating field penetrates more or less into the interior of the conductive body depending on the frequency of the alternating current. The frequency may therefore be chosen so as to enable the field to penetrate only into the surface layer whose temperature is to be measured. In general, use should preferably be made of an alternating current of about 500 P. P. S.

The alternating field is preferably produced by means of current-carrying coils which are wound on one or several iron bodies arranged opposite the surface of the roller at a definite distance. If the temperature of a calender roller is also to be tested during rotation, irregularities of the rollers may produce objectionable variations in the testing circuit, by causing periodic variations in current intensity. In order to reduce these disturbances, care should be taken to keep the iron body at a definite distance from the roller surface.

Reference is to be had to the accompanying drawings in which Fig. 1 is a partial diagrammatic view illustrating the principle of my invention; Fig. 2 is a diagram showing another form of my invention; Figs. 3 and 4 are diagrammatic views illustrating two different kinds of circuit connections embodying my invention, and Fig. 5 is a view showing a construction combining the features of Figs. 2 and 4.

Fig. 1 is a diagrammatic showing of a device for determining the temperature of calender rollers. 1 is a portion of the roller, 2 a U-shaped iron body carrying an exciting winding consisting of the coils 3 and 4 which are connected through an electric measuring set 5 such as an ammeter to a source of alternating current 6. The pole ends of the iron body are placed opposite to the surface of the roller at a sufficiently great distance therefrom.

A further reduction of disturbances produced by irregularities of the roller spacing can be obtained by providing means for automatically maintaining the distance of the iron body from the roller, even when the latter rotates. For this purpose, the iron body, or a casing surrounding it, may be fastened, for instance, to an arm 29 (Fig. 4) pivoted on a fixed bearing 30. The casing 22 containing the iron core is equipped with one or several rolls 31 resting against the surface of the roller 1. An adjustable counter-weight 32 permits of adequately controlling the pressure with which the rolls rest on the roller.

For the same purpose, however, several iron bodies may also be distributed uniformly around the circumference of the roller, in order to compensate for the disturbing influence exerted during rotation.

Fig. 2 shows such a device schematically. The exciting windings 3 and 4 of two iron bodies 2' and 2'' are connected in the circuit of the alternating current source 6 through the measuring set 5, the iron bodies being arranged at two points of the roller surface, opposite to one another. Other test errors may also be caused by variations in the ohmic resistance of the exciting coil, arising from fluctuations in temperature. In order to avoid this error, the cross-sectional area of the coil-wire should, on the one hand, be made as large as possible so as to enable the ratio of the ohmic resistance to the inductive resistance to be as small as possible and, on the other hand, the winding should be made of a material whose resistance is largely independent of temperature. Finally a special temperature-responsive resistance used for compensation purposes, may also be connected in the exciting circuit.

The measuring device described in Fig. 1 has, in addition, the fundamental disadvantage, that the voltage of the current source enters into the test reading. This disadvantage may be eliminated by the use of a quotient measuring instrument in which the electrically produced directing force is independent of the voltage producing the alternating field.

In order to make the measurement as sensitive as possible, use should be made of a bridge circuit. The exciting winding of the alternating field is then preferably inserted in one of the bridge arms, whereas the electric measuring set is installed in the diagonal branch.

The use of a separately excited measuring set is of special advantage. Such measuring sets show, in general, greater sensitivity than others without separate excitation. In addition, their indications are dependent on the phase of the exciting current. In this case, it is desirable to provide, in the exciting circuit, means for changing the phase of the exciting current. In this manner, it is possible to adjust the phase of the exciting current so as to reduce the test errors. It has been found that the component of the diagonal current attributable to the variable distance of the exciting winding of the alternating current from the surface of the conductive body under test differs in phase from the component of the diagonal current originating from variations in the temperature to be measured. In consequence thereof, it is possible to shift the phase of the exciting current of the measuring set substantially 90° as compared with the phase of such component of the diagonal current as depends on variations in spacing. In this case, the influence of the distance between alternating field and roller surface becomes negligibly small.

As a separately excited measuring set, use may be made of a phase-responsive alternating current instrument, for instance a dynamometric measuring set. If a dynamometric double-coil instrument is employed, this has, at the same time, the advantage that the indication becomes independent of variations in voltage of the alternating current source. It is of special advantage to use a direct current instrument in connection with a separately excited synchronous switch acting as a rectifier. The direct current instrument may then be a cross-coil instrument, in order to obtain an indication independent of voltage fluctuations. Figs. 3 and 4 show the schematic circuit diagram of two other constructional examples.

In Fig. 3, 2 is the U-shaped iron body carrying the exciting winding 3 and having poles opposite the surface of the roller under test. The winding 3 is connected in one arm of the bridge circuit which, in addition, contains the fixed resistances 7, 8 and 9 and a resistance 10 inserted between the fixed resistances 7 and the winding 3 and having an adjustable tap 11. The tap 11 on the one hand, and the junction point 12 between the resistances 8 and 9 on the other hand, are connected respectively with the terminals 13 and 14 of an alternating current source. To the diagonal points 15 and 16 there is connected the moving coil 17 of an electrodynamic double coil instrument, the second moving coil of which, 18, is connected in a well known manner through a resistance 19. The fixed field coil 20 of the double-coil instrument is connected to the same alternating current source 13, 14 through a phase shifter, of any type known in the art.

If the temperature of the roller 1 varies, this results in a variation of the electric resistance of the roller material and, correspondingly, the intensity of the eddy currents produced in the surface layer of the roller by the alternating field of the exciting winding 3 also varies. This results in a variation of the impedance of the winding 3. If now the bridge is balanced by adjustment of the tap 11 to a value which is in accordance with a definite standard temperature of the roller, the diagonal branch of the bridge and the moving coil 17 of the double-coil instrument will carry a current whose intensity is in accordance with the variation from the standard temperature, which, with adequate calibration, may thus be read off the scale of the double-coil instrument.

For any phase of the exciting current in the field winding 20, the indication is also affected by the distance between the iron body 2 and the roller 1. In order to reduce this error, emanating from unintentional variations of this spacing, the phase shifter 21 may be used to adjust the phase of the exciting current in such a manner that, with constant temperature of the roller, a displacement of the iron body, as compared with the roller, produces the slightest possible variation in the deflection on the instrument.

The circuit of the device schematically shown in Fig. 4 is essentially in accordance with that of Fig. 3. The same parts are designated by like figures. The iron body 2 opposite to the roller 1 carrying the winding 3 is enclosed in a heat-insulated casing 22, which contains, in addition, a temperature-responsive resistance 23, in series with the winding 3, in one of the bridge arms. The resistance 23 is designed to compensate for the influence of the temperature of the iron body carrying the winding 3 on the reading, and the purpose of the heat-insulating envelope is to subject the resistance 23 to the temperatures of the iron body carrying the winding 3. The rest of the bridge circuit is the same as that shown in Fig. 3.

As a measuring set, use is made, of a direct current instrument whose moving coil 24 is connected to the diagonal points 15 and 16. In parallel with the moving coil there is a contact 25 of a separately excited synchronous switch acting as a rectifier. The exciting winding 26 of the synchronous switch is connected, through a phase shifter 21, to the terminals 13 and 14 of the same alternating current source, which also supplies the current for the bridge circuit. As a synchronous switch, use may be made, in a manner well-known in the art, of an electromagnetically operated vibrating reed rectifier. A polarity-responsive resistance, for instance a separately controlled dry rectifier, may, however, also be employed. In any case, as in the circuit shown in Fig. 3, the phase shifter 21 should be adjusted so as to reduce to a negligible amount the action of the variations of the distance separating the iron body 2 and the roller 1 from one another.

As a direct current instrument, use may be made of a moving coil instrument having torsional springs as mechanical counterbalance. But if the influence of voltage variations of the alternating current source is to be eliminated, use is preferably made of a quotient measuring instrument, for example, a cross-coil instrument, whose control coil 27 is connected, through a rectifier 28, to the leads of the alternating current source.

In Fig. 5, I have illustrated an embodiment which combines the features of Figs. 2 and 4. The lower portion of Fig. 5 is practically identical with Fig. 4, the only difference being that the resistance 10 is not connected directly with the compensating resistance 23, but indirectly through the coil 3' and the compensating resistance 23' of a second core 2ª, located at a point of the roller 1 diametrically opposite to the core 2. The parts 22', 31', 29', 30' and 32' perform the same functions as the similarly numbered parts at the lower portion of Fig. 5. Since the small roller 31' bears on the roller 1 downwardly, instead of upwardly as does the roller 31, the weight 32' is arranged on the same side of the fulcrum 30' as the casing 22'.

I claim:

1. An apparatus for measuring the temperature of the surface layer of rotating electrically conductive bodies comprising means for inducing eddy currents in said surface layer, said means including a source of alternating electric current, a plurality of electromagnetic coils conductively connected to said source of alternating current and arranged at substantially equal distances around the circumference of the body and closely adjacent but spaced from said surface, and means for determining variations in the impedances of said coils.

2. An apparatus for measuring the temperature of the surface layer of an electrically conductive body, comprising means for inducing eddy currents in said surface layer, said means comprising a source of alternating current and at least one electromagnetic coil connected to said source of alternating current, means for determining variations in the impedance of said coil, said means comprising a Wheatstone bridge, said coil being connected in one of the branches of said bridge, and an electrical measuring instrument including a measuring coil connected in the diagonal of the bridge and a second measuring coil, means to supply current from said source to said measuring instrument including means to connect said second measuring coil to said source, means to rectify the current supplied to said second measuring coil, a shunt in said diagonal around said first measuring coil, and a rectifier connected in said shunt, and controlled by current from said source.

3. An apparatus for measuring the temperature of the surface layer of an electrically conductive body, comprising means for inducing eddy currents in said surface layer, said means comprising a source of current and a coil connected to said source of current and adjacent the body, means to measure variations in the impedance of said coil, and a compensating resistance connected in the circuit which includes said coil and located adjacent the body to compensate for variations of impedance caused by variations in the body temperature of said coil.

4. An apparatus for measuring the temperature of the surface layer of an electrically conductive body, comprising means for inducing eddy currents in said surface layer, said means comprising a source of current and a coil connected to said source of current and adjacent the body, means to measure variations in the impedance of said coil, and a compensating resistance connected in series with and located adjacent the coil to compensate for variations of impedance caused by variations in the body temperature of said coil.

5. An apparatus for measuring the temperature of the surface layer of an electrically conductive body, comprising means for inducing eddy currents in said surface layer, said means comprising a source of current and a coil connected to said source of current and adjacent the body, means to measure variations in the impedance of said coil, said coil having a core of magnetic material, a casing of heat-insulating material surrounding said coil and having an opening on the side adjacent said body through which said core extends towards said body, and a compensating resistance connected in the circuit which includes said coil and arranged within said casing to compensate for variations of impedance caused by variations in the body temperature of said coil.

6. An apparatus for measuring the temperature of the surface layer of an electrically conductive body, comprising means for inducing eddy currents in said surface layer, said means comprising a source of current and a coil connected to said source of current and adjacent the body, means to measure variations in the impedance of said coil, said means including a Wheatstone bridge, said coil having a core of magnetic material and being connected in one branch of said bridge, a measuring instrument connected in the diagonal of said bridge, a casing of heat-insulating material surrounding said coil and having an opening on the side adjacent said body through which said core extends towards said body and a compensating resistance connected in said branch in series with said coil to compensate for variations of impedance caused by variations in the body temperature of said coil.

7. An apparatus for measuring the temperature of the surface layer of an electrically conductive rotating cylinder, comprising means for inducing eddy currents in said surface layer, said means comprising a source of current and a coil connected to said source of current and adjacent the cylinder, means to measure variations in the impedance of said coil, said coil having a core of magnetic material, a casing of heat-insulating material surrounding said coil and having an opening on the side adjacent said cylinder through which said core extends towards said cylinder, means on said casing to space the same from said cylinder, and means normally urging said casing towards said cylinder.

8. An apparatus for measuring the temperature of the surface layer of an electrically conductive rotating cylinder, comprising means for inducing eddy currents in said surface layer, said means comprising a source of current and a coil connected to said source of current and adjacent the cylinder, means to measure variations in the impedance of said coil, said coil having a core of magnetic material, a casing of heat-insulating material surrounding said coil and having an opening on the side adjacent said cylinder through which said core extends towards said cylinder, a pivoted lever, said casing being mounted on said lever, means to space said casing from said cylinder, and a weight on said lever on the other side of its pivot for normally urging said casing towards said cylinder.

9. An apparatus for measuring the temperature of the surface layer of an electrically conductive rotating cylinder, comprising means for inducing eddy currents in said surface layer, said means comprising a source of current and a coil connected to said source of current and adjacent the cylinder, means to measure variations in the impedance of said coil, said coil having a core of magnetic material, a casing of heat-insulating material surrounding said coil and having an opening on the side adjacent said cylinder through which said core extends towards said cylinder, means on said casing to space the same from said cylinder, means normally urging said casing towards said cylinder, and a compensating resistance connected in the circuit which includes said coil and arranged within said casing to compensate for variations of impedance caused by variations in the body temperature of said coil.

10. Apparatus for directly indicating the temperature of the surfaces of calender rolls, comprising, in combination, at least one iron core, a coil wound on said core, means to maintain said core at a definite distance from the surface of the roll, a Wheatstone bridge circuit, said coil being located in one branch of such circuit, means to supply alternating current to said circuit and thereby to said coil, a dynamometric double coil instrument, one movable coil of said instrument lying in the diagonal branch of said bridge circuit, the other movable coil of said instrument lying in a closed circuit which includes a resistance, means connecting the field winding of the instrument to the source of alternating current, and a phase displacer in said last connecting means.

11. Apparatus for directly indicating the temperature of the surface of calender rolls, comprising, in combination, at least one iron core, a coil wound on said core, means to maintain said core at a definite distance from the surface of the roll, a Wheatstone bridge circuit, said coil being located in one branch of such circuit, means to supply alternating current to said circuit and thereby to said coil, a direct current instrument, the movable coil of said instrument lying in the diagonal branch of said bridge circuit, a tongue rectifier having its contact connected in parallel with the said movable coil, and having an excitation winding, means connecting said last winding to the alternating current source, and a phase displacer in said last connecting means.

12. Apparatus for directly indicating the temperature of the surfaces of calender rolls, comprising, in combination, at least one iron core, a coil wound on said core, means to maintain said core at a definite distance from the surface of the roll, a Wheatstone bridge circuit, said coil being located in one branch of such circuit, means to supply alternating current to said circuit and thereby to said coil, a direct current cross-coil instrument, means connecting one part of the movable cross-coil of said instrument to the alternating current source, a rectifier in said connecting means, and a tongue rectifier having its contact connected in parallel with the other part of said movable cross-coil, and having an excitation winding, means connecting said last winding to the alternating current source, and a phase displacer in said last connecting means.

GEORG KEINATH.